Aug. 9, 1966        P. E. CARON        3,265,791
METHOD OF DIE-BAKING MOLDABLE WOOD FIBER PARTS
Filed Feb. 20, 1963
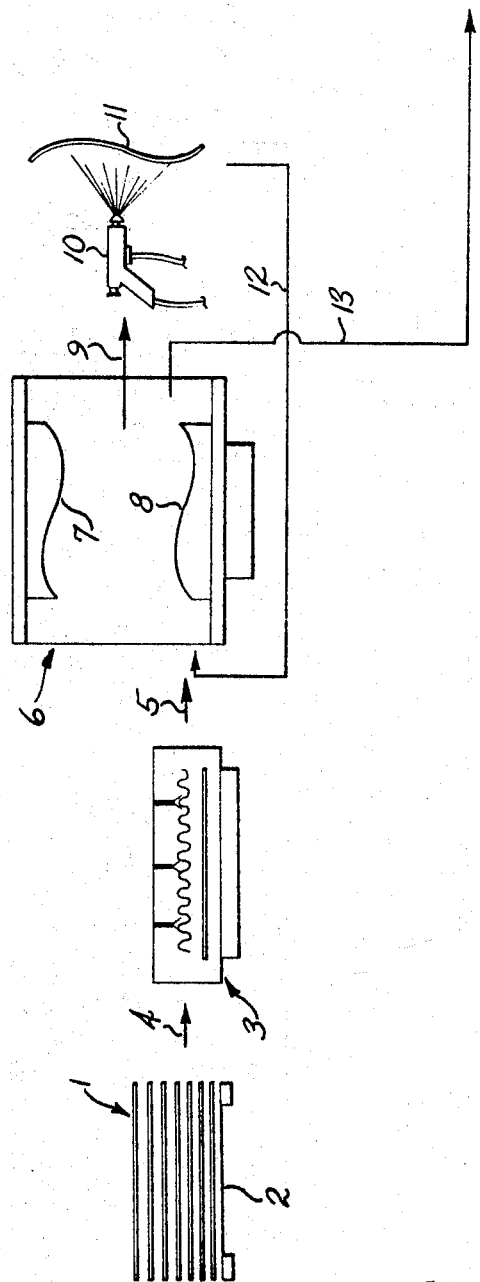
INVENTOR.
PHILIP E. CARON
BY
ATTORNEY 3,265,791
METHOD OF DIE-BAKING MOLDABLE WOOD FIBER PARTS
Philip E. Caron, Longview, Wash., assignor to Weyerhaeuser Company, Tacoma, Wash., a corporation of Washington
Filed Feb. 20, 1963, Ser. No. 260,061
7 Claims. (Cl. 264—129)

This invention relates to a method of finishing wood fiber parts. More specifically, this invention relates to a method of finishing moldable wood fiber parts during the molding cycle to form a sealed surface thereon.

There are many classes of moldable materials on the market today. One of these classes is a moldable wood fiber product manufactured by the Weyerhaeuser Company, of Tacoma, Washington, and sold under the trade name of "Pres-Tock."

This product generally comprises a quantity of comminuted cellulose material, preferably defiberized lignocellulose. This is mixed with about 10% to about 40% by weight of thermoplastic binder and about 1% to 15% by weight of a thermosetting resin. Preferably about 10% of the thermoplastic binder is used. The resulting molding mixture then is felted into a mat and prepressed to an intermediate compressed moldable fiber mat which has a density of at least about 20 lbs. per cu. ft. This intermediate mat is subjected to the action of steam or other hot aqueous vapors and is formed into a preselected shape.

A variety of comminuted cellulose materials may be used as starting materials in the practice of the present invention. Although suitable materials include sawdust, shavings, wood flour, and various chemicals produced, it is preferred to employ defiberized lignocellulose. This may be derived from any suitable source such as cane, straw, bark of trees, and the like, but preferably it is derived from the wood of trees of various species.

The resin binder system as a class used singly or in admixtures with each other are suitable for the purpose of the present invention, the particular binder employed being determined by the properties of strength, hardness, surface support desired in the molded product. Such materials include, for example, the various grades of asphalt and gilsonite; the thermoplastic cellulose ethers, including ethyl cellulose, benzyl cellulose and the like; the thermoplastic cellulose esters, such as cellulose acetate; the thermoplastic coumarones; the thermoplastic coumarone-indene resins; the thermoplastic polyvinyl resins, including polyvinyl acetate, polyvinyl chloride and copolymers thereof; the thermoplastic alkyd resins; the thermoplastic polystyrenes; and rosin. The resinous condensation products of urea and an aldehyde and of phenol and an aldehyde, for example, phenol-formaldehyde resins, which at least in the preliminary stages of the pressing operation are thermoplastic in properties, are suitable thermosetting resins.

In general, this product is manufactured by the following process:

Step 1: Selecting sound whole wood for chips.

Step 2: Defiberizing the chips under carefully controlled conditions. This includes treating the chips with steam under carefully controlled pressure and temperature.

Step 3: Adding a selected resin binder system to the hot, moist fiber.

Step 4: Drying the fiber-resin mixture under carefully controlled conditions which includes the humidity under which the drying process is carried out to prevent curing of the thermosetting resin.

Step 5: Continuously felting the dried fibers into a thick, low density mat.

Step 6: Predensifying the continuous mat with steam and pressure to facilitate handling, shipping and conversion.

Step 7: Cutting the mats into piece sizes required by the converter and the ultimate consumer.

Step 8: Palletizing the pieces for shipment.

Since this material can be readily formed into various shapes and has relatively high-strength characteristics and a relatively low cost per unit, it has enjoyed a substantial commercial success.

The above-noted formed wood fiber part is formed by simply placing the part in a steam atmosphere and then pressed under heat and pressure and the contour desired can be readily achieved by this type of operation.

However, difficulties have arisen in finishing the formed wood fiber part with liquid systems in a post-press operation. During post-press finishing operations, portions of the wood fiber part having open or porous surfaces create a sealing or priming problem. This problem is also evident in plain flat fiber products produced by a pressing operation. It has been proposed to eliminate this problem by simply hand filling the more offending areas with a suitable sealing material such as a wood putty. However, this procedure is costly and time-consuming and therefore is unsatisfactory. In addition, it has been proposed to pre-press treat the surface of the moldable wood fiber mat with suitable resin systems to eliminate this problem of open or porous surfaces. This treatment however is limited to the surfaces of the wood fiber part that are not contoured during the molding cycle. The contoured portions of the molded material expose areas of untreated fibers which become the final unfilled surface of the molded part.

Another proposed solution was to form a thin low cost phenolic sheet that is bonded to the surface of the wood fiber part. This system is also limited to the parts with very mild contours since the phenolic sheets have poor formability. This system is also unsatisfactory since it increases the manufacturing and final cost of molded parts.

FIGURE 1 is a diagrammatic illustration of the process of the present invention.

I have discovered a method of improving the finishing of formed wood fiber parts. The method is achieved by treating the part surface after the contours have been formed in the moldable wood part, but before the forming cycle is completed.

The basic process of this invention is as follows:

A die to give the proper or desired contour and surface finish to the part is selected. The moldable wood fiber mat is then placed in the die and pressed for 10–40 seconds at a pressure of 200–500 p.s.i. and temperature of 300° F.–380° F. The pressure is then slowly released and the part is removed from the die. During this initial pressing operation, the wood fiber is plasticized and the resin binder system is activated. This will allow the wood fiber mat to be molded. After the formed wood fiber part is removed from the die, the hot surface thereof is immediately sprayed with a suitable resinous sealing solution in a predetermined amount. Immediately after the application of the resinous solution, the part is returned to the die and then pressed for an additional period of 10–40 seconds and at the same temperature and pressure range of the initial pressing. The final pressing operation will finish curing the formed wood fiber part and also will set the resinous sealing or priming material. Due to the highly polished surface of the die, a smooth, sealed surface is achieved on the formed wood fiber part.

In the drawings, the moldable wood fiber mats 1 are illustrated on pallets 2. The mats 1 are removed from the pallets 2 and placed into a steam chamber 3 as indicated by arrow 4. After a predetermined time in the steam chamber 3, the mats are removed therefrom and placed into a press 6 as indicated by arrow 5. The press 6 is provided with the usual dies 7 and 8 and are heated in a conventional manner. After the moldable wood fiber mat has been in the press 6 for a predetermined length of time, the mats 11 are sprayed with the resinous sealing solution by a gun 10 as indicated by the arrow 9. The mats 11 are immediately replaced into the press 6 as indicated by arrow 12 to fully cure the treated mat. After the second pressing of the part is completed, the same is removed as indicated by arrow 13.

The process of the present invention can be further illustrated by the following example:

*Example I*

A good quality, chrome plated die was first selected to give the proper contour to the wood fiber part. A moldable wood fiber mat was then placed into the die to press for 20 seconds at 350 p.s.i. and 300° F. After a slow release of pressure, the part was removed from the die and the hot surface was immediately sprayed with Amres 6130, a phenolic resin, at a usage of approximately 5 gms. of solids per sq. ft. To improve sprayability of the resin solution, the resin solids were adjusted to 25%. Most of the solution water in the resinous solution immediately vaporized upon contact with the hot surface of the formed wood fiber part. Immediately after application of the resin solution to the wood fiber part, the wood fiber part was returned to the die and pressed for 20 seconds at 350 p.s.i. and 300° F. The formed wood fiber part was then removed from the die, and a hard, glossy surface was produced that could be painted well in addition to having the proper contoured surface.

Although any number of suitable materials can be used as the sealer or primer, the curing temperature of the formed wood fiber part limits these materials to those which are hard or thermoset when the part is removed from the hot die. Resins of the following type can be readily used in the die-bake priming process; phenol formaldehyde, urea-formaldehyde, resorcinol, melamine, acrylic and polyurethane.

In order to spray the priming or sealing material onto the formed part surface, it is necessary to limit the amount of inert filler used therein. Coarse or excessive amounts of fillers tend to be strained out of the spray gun used in the process. Acrylic emulsion paints having pigment volume concentrations up to 35% are suitable in the process. Moreover, an excessive amount of the sealer or primer will produce a glazed surface on the part which has poor paint adhesion. Accordingly, the optimum amount of primer or sealer to achieve the best paintability will vary with the material being used and formulation of the part shape and therefore can be preselected by the operator.

The cure times of the resin systems used require modifications of the press cycle in accordance with the type of resins used. Therefore, the operator will readily determine the cure time in accordance with the resin that is being used.

With this process in use, a primed formed fiber part ready for the final finishing step is obtained from the die. In addition the die action eliminates grain raising normally caused by primers, eliminating a secondary sanding operation.

While specific examples of a preferred procedure embodying the above invention have been described above, it will be apparent that many changes and modifications may be made in those methods of procedure without departing from the spirit of the invention. It should, therefore, be understood that the examples cited and the methods of procedure set forth above are intended to be illustrative only and not intended to limit the scope of the invention.

What is claimed is:

1. A method of finishing a formed wood fiber part, comprising; placing the moldable wood fiber mat in a polished molding die; pressing the wood fiber mat in the die at a pressure and temperature to plasticize the wood fibers and activate the resin binder system to form the desired contour; releasing the pressure; spraying the hot wood fiber part with a sealing material; immediately repressing the treated wood fiber part while in a hot condition to fully cure the sealing material and wood fiber part.

2. A method of finishing a formed wood fiber part, comprising; placing the moldable wood fiber mat in a polished molding die; pressing the wood fiber mat in the die at a temperature and pressure to plasticize the wood fibers and activate the resin binder system to form the desired contour; slowly releasing the pressure; spraying the hot wood fiber part with a sealing material; immediately repressing the treated wood fiber part while in a hot condition to fully cure the sealing material and wood fiber part.

3. A method of finishing a formed wood fiber part, comprising; placing the moldable wood fiber mat in a polished molding die; pressing the wood fiber mat in the die for 10–40 seconds at a temperature and pressure to plasticize the wood fibers and activate the resin binder system to form the desired contour; slowly releasing the pressure; spraying the hot wood fiber part with a sealing material; immediately repressing the treated wood fiber part while in a hot condition to fully cure the sealing material and wood fiber part.

4. A method of finishing a formed wood fiber part, comprising; placing the moldable wood fiber mat in a polished molding die; pressing the wood fiber mat in the die for 10–40 seconds at a temperature of 300° F. to 380° F. and pressure of 300–500 p.s.i. to plasticize the wood fibers and activate the resin binder system to form the desired contour; slowly releasing the pressure; spraying the hot wood fiber part with a sealing material; immediately repressing the treated wood fiber part while in a hot condition to fully cure the sealing material and wood fiber part.

5. A method of finishing a formed wood fiber part, comprising; placing the moldable wood fiber mat in a polished molding die; pressing the wood fiber mat in the die for 20 seconds at a pressure of 350 p.s.i. and temperature of 300° F. to plasticize the wood fibers and activate the resin binder system to form the desired contour; slowly releasing the pressure; spraying the hot wood fiber part with a resinous sealing material; immediately repressing the treated wood fiber part while in a hot condition to fully cure the resinous sealing material and wood fiber part.

6. A method of finishing a formed wood fiber part, comprising; placing the moldable wood fiber mat in a polished molding die; pressing the wood fiber mat in the die for 10–40 seconds at a temperature of 300° F. to 380° F. and a pressure of 300 to 500 p.s.i. to plasticize the wood fibers and activate the resin binder system to form the desired contour; slowly releasing the pressure; spraying the hot wood fiber part with a resinous sealing material; immediately repressing the treated wood fiber part while in a hot condition for 10–40 seconds to fully cure the resinous sealing material and wood fiber part.

7. A method of finishing a formed wood fiber part, comprising; placing the moldable wood fiber mat in a polished molding die; pressing the wood fiber mat in the die for 10–40 seconds at a temperature of 300° F. to 380° F. and a pressure of 300 to 500 p.s.i. to plasticize the wood fibers and activate the resin binder system to form the desired contour; slowly releasing the pressure; spraying the hot wood fiber part with a resinous sealing material; immediately repressing the treated wood fiber part while in a hot condition for 10–40 seconds at a temperature of 300° F. to 380° F. and pressure of 300–500 p.s.i. to fully cure the resinous sealing material and wood fiber part.

(References on following page)

References Cited by the Examiner

UNITED STATES PATENTS

| | | | |
|---|---|---|---|
| 2,120,137 | 6/1938 | Mason | 162—11 |
| 2,220,047 | 10/1940 | Mason | 162—163 |
| 2,638,421 | 5/1953 | Serres | 264—236 XR |
| 2,649,034 | 8/1953 | Gramelspacher | 264—216 XR |
| 2,654,296 | 10/1953 | McCorkle | 264—137 X |
| 2,700,796 | 2/1955 | Roman | 264—71 |
| 2,872,337 | 2/1959 | Heritage et al. | 264—112 XR |
| 2,907,071 | 10/1959 | Meiler et al. | |
| 3,055,783 | 9/1962 | Hendrickson et al. | |

ALEXANDER H. BRODMERKEL, *Primary Examiner.*

P. E. ANDERSON, *Assistant Examiner.*